(12) United States Patent
Mansour

(10) Patent No.: US 11,969,706 B1
(45) Date of Patent: Apr. 30, 2024

(54) USE OF A BY-PRODUCT OF CHLORELLA ELLIPSOIDEA BIODIESEL PRODUCTION FOR AQUACULTURE DISCHARGE TREATMENT

(71) Applicant: KING FAISAL UNIVERSITY, Al-Ahsa (SA)

(72) Inventor: Abdallah Tageldein Mansour, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/486,931

(22) Filed: Oct. 13, 2023

Related U.S. Application Data

(63) Continuation of application No. 18/199,102, filed on May 18, 2023.

(51) Int. Cl.
| | |
|---|---|
| *B01J 20/24* | (2006.01) |
| *A01N 65/03* | (2009.01) |
| *A01P 1/00* | (2006.01) |
| *B01J 20/28* | (2006.01) |
| *B01J 20/34* | (2006.01) |
| *C02F 1/00* | (2023.01) |
| *C02F 1/28* | (2023.01) |

(Continued)

(52) U.S. Cl.
CPC .............. *B01J 20/24* (2013.01); *A01N 65/03* (2013.01); *A01P 1/00* (2021.08); *B01J 20/28004* (2013.01); *B01J 20/2803* (2013.01); *B01J 20/28052* (2013.01); *B01J 20/28085* (2013.01); *B01J 20/3425* (2013.01); *B01J 20/3475* (2013.01); *C02F 1/001* (2013.01); *C02F 1/286* (2013.01); *C02F 1/50* (2013.01); *C02F 2101/105* (2013.01); *C02F 2101/16* (2013.01); *C02F 2101/30* (2013.01); *C02F 2303/04* (2013.01); *C02F 2303/16* (2013.01)

(58) Field of Classification Search
CPC ..... A01N 65/03; B01J 20/24; B01J 20/28004; B01J 20/2803; B01J 20/28052; B01J 20/28085; B01J 20/3425; B01J 20/3475; C02F 1/001; C02F 1/286; C02F 1/50; C02F 2101/105; C02F 2303/04; C02F 2303/16
See application file for complete search history.

(56) References Cited

U.S. PATENT DOCUMENTS

| | | | |
|---|---|---|---|
| 2013/0236937 A1* | 9/2013 | Harlin | C12P 7/6445 502/402 |
| 2020/0231477 A1* | 7/2020 | Wen | C12N 1/12 |

FOREIGN PATENT DOCUMENTS

| | | | | |
|---|---|---|---|---|
| WO | WO-2015017794 A1 * | 2/2015 | | C02F 3/006 |

OTHER PUBLICATIONS

Hu, et al., "Domestic Wastewater Reclamation Coupled with Biofuel/Biomass Production Based on Microalgae: A Novel Wastewater Treatment Process in the Future," J. of Water & Environ. Tech., 9:2:199-207 (Year: 2011).*

* cited by examiner

*Primary Examiner* — Patrick Orme
(74) *Attorney, Agent, or Firm* — Nath, Goldberg & Meyer; Richard C. Litman

(57) ABSTRACT

Filters comprising a *Chlorella ellipsoidea* by-product (lipid-free biomass) for aquaculture wastewater treatments and methods for removing ammonia, phosphorous, and organic matter from aquaculture wastewater using such filters. The filters have multiple layers of a compressed *Chlorella ellipsoidea* lipid free biomass by-product of *Chlorella ellipsoi-*

(Continued)

*dea* biodiesel production, wherein each of the multiple layers is separately changeable.

19 Claims, 2 Drawing Sheets

(51) Int. Cl.
    *C02F 1/50*         (2023.01)
    *C02F 101/10*      (2006.01)
    *C02F 101/16*      (2006.01)
    *C02F 101/30*      (2006.01)

USE OF A BY-PRODUCT OF CHLORELLA ELLIPSOIDEA BIODIESEL PRODUCTION FOR AQUACULTURE DISCHARGE TREATMENT

CROSS-REFERENCE TO RELATED APPLICATION

This application is a continuation of U.S. patent application Ser. No. 18/199,102, filed on May 18, 2023, the entire contents of which are incorporated herein by reference.

BACKGROUND

1. Field

The disclosure of the present patent application relates to the use of a *Chlorella ellipsoidea* by-product (lipid-free biomass) for aquaculture wastewater treatments, and particularly to methods for removing ammonia, phosphorous, and organic matter from aquaculture wastewater.

2. Description of the Related Art

One of the main aquaculture expansion limits is the environmental impact of aquaculture. Due to its typical high content of ammonia and phosphorus, the discharge of aquaculture wastewater to the surrounding natural water bodies causes dramatic eutrophication or organic enrichment. This is caused mainly by non-consumed feed (especially due to overfeeding), the decomposition of dead organisms, and overfertilization. It is well documented that of the total nitrogen supplemented to the cultured organisms, only 20-50% is retained as biomass by the farmed organisms, while the rest is released to the water column or sediment, and eventually discharged in the effluents toward the receiving ecosystems.

The extra content of wastewater nutrients causes dramatic phytoplankton blooms (sometimes of toxic microalgae, such as red tides), burring, and death of benthic organisms, as well as undesirable odors and the presence of pathogens in the discharge sites. In addition, modern aquaculture systems, such as recirculating aquaculture systems (RAS), that require several stages of water treatment to reuse water in the production systems need high energy consumption and are considered as costly processes.

Algal biomass is a natural source of bioactive substances that can be employed in a variety of applications, such as aquaculture, biofertilizers, food supplements, cosmetics, biodiesel, antimicrobial activities, and bioremediation. *Chlorella ellipsoidea* is one of the highest lipid-producing algae (30-70% dry weight) with a promising application in biodiesel and bioethanol production. The complete utilization of algae biodiesel by-product is not usefully performed. Microalgal biomass has been studied as an adsorbent for the purification of water, owing to its capability of applying and/or accumulating heavy metals, nutrients, and various materials in its cells. Further, algal biomass has several functional groups, such as hydroxyl, carboxyl, phosphate, and sulfate, as well as other charged groups, which can interfere with pollutant binding sites in the biomass.

Thus, novel, sustainable, and cost-effective water treatment methods to alleviate the ecological impact of aquaculture and/or the cost of processing RAS solving the aforementioned problems are desired.

SUMMARY

The present subject matter relates to filters comprising a *Chlorella ellipsoidea* by-product (lipid-free biomass) for aquaculture wastewater treatments and methods for removing ammonia, phosphorous, and organic matter from aquaculture wastewater using such filters. The filters can have multiple layers of a compressed *Chlorella ellipsoidea* lipid free biomass by-product of *Chlorella ellipsoidea* biodiesel production, wherein each of the multiple layers can be separately changeable.

In one embodiment, the present subject matter relates to a filter for treating aquaculture wastewater, the filter comprising: multiple layers of a compressed *Chlorella ellipsoidea* lipid free biomass by-product of *Chlorella ellipsoidea* biodiesel production and a water-resistant substance to solidify the compressed *Chlorella ellipsoidea* lipid free biomass by-product into the multiple layers, wherein each of the multiple layers is separately changeable.

In another embodiment, the present subject matter relates to a method for treating aquaculture wastewater, the method comprising: providing a filter comprising a linear arrangement of multiple layers of a compressed *Chlorella ellipsoidea* lipid free biomass by-product of *Chlorella ellipsoidea* biodiesel production and a water-resistant substance to solidify the compressed *Chlorella ellipsoidea* lipid free biomass by-product into the multiple layers, wherein each of the multiple layers is separately changeable; passing aquaculture wastewater to be treated through the filter such that the aquaculture wastewater initially contacts a first layer of the multiple layers having a high porosity, with each succeeding layer following the first layer in the linear arrangement has a lower porosity than its immediately preceding layer; removing ammonia, phosphorus, and organic matter from the aquaculture wastewater as the aquaculture wastewater passes through the filter; and recovering treated wastewater having low levels of ammonia, phosphorus, and organic matter.

These and other features of the present subject matter will become readily apparent upon further review of the following specification.

DETAILED DESCRIPTION OF THE PREFERRED EMBODIMENTS

Figure 1:
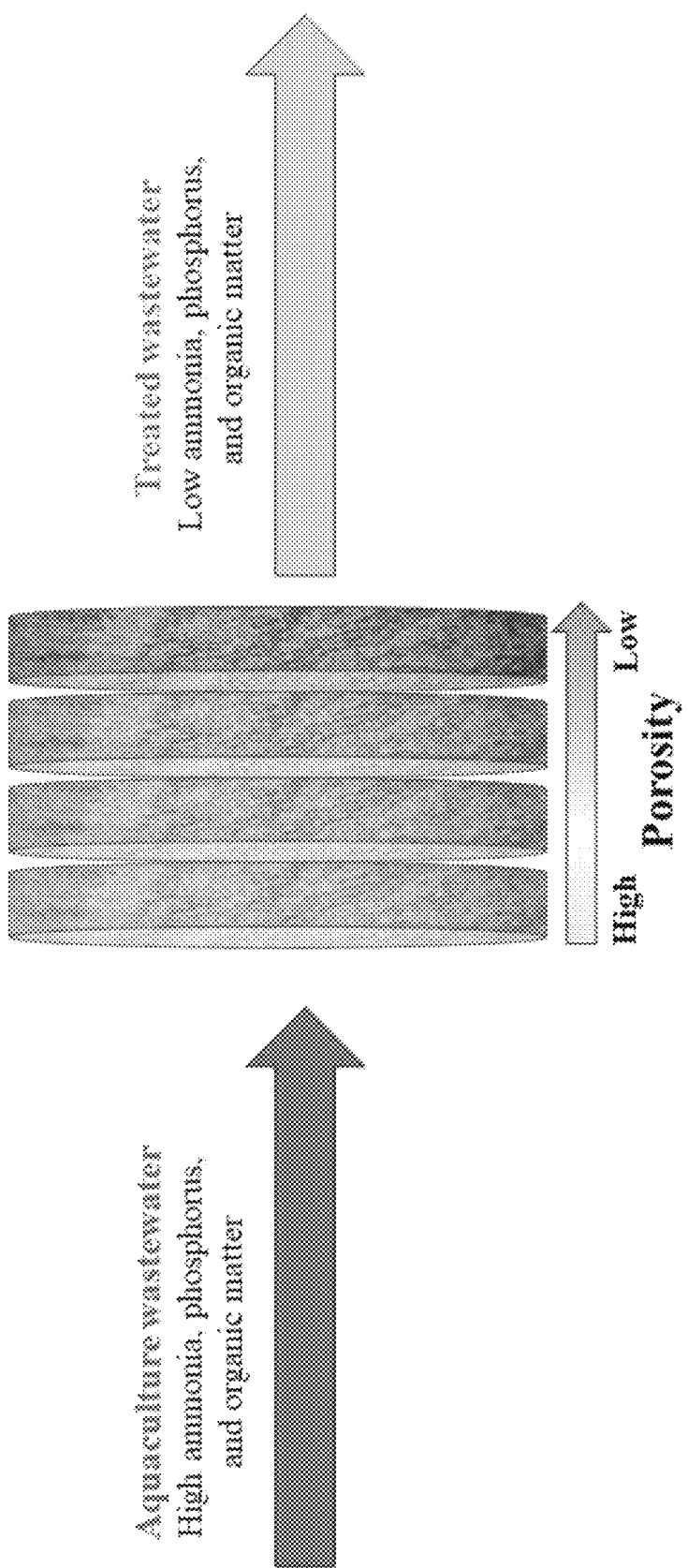
FIG. 1 shows a flow diagram of the present method.

The following definitions are provided for the purpose of understanding the present subject matter and for construing the appended patent claims.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to filters comprising a *Chlorella ellipsoidea* by-product (lipid-free biomass) for aquaculture wastewater treatments and methods for removing ammonia, phosphorous, and organic matter from aquaculture wastewater using such filters. The filters can have multiple layers of a compressed *Chlorella ellipsoidea* lipid free biomass by-product of *Chlorella ellipsoidea* biodiesel production, wherein each of the multiple layers can be separately changeable. The present filter can require little to no mechanical equipment to be effective, and can consume less energy than current, conventional methods for aquaculture wastewater treatment.

In one embodiment, the present subject matter relates to a filter for treating aquaculture wastewater, the filter comprising: multiple layers of a compressed *Chlorella ellipsoidea* lipid free biomass by-product of *Chlorella ellipsoidea* biodiesel production and a water-resistant substance to solidify the compressed *Chlorella ellipsoidea* lipid free biomass by-product into the multiple layers, wherein each of the multiple layers is separately changeable.

In one embodiment, the filter can have a gradient of porosity to allow efficient adsorption of one or more of ammonia, phosphorous, or wastes from the aquaculture wastewater. In other embodiments, the filter can remove one or more of ammonia, nitrites, nitrates, and phosphorous from the aquaculture wastewater. This removal can be based on various functional groups of the components to be removed from the wastewater, such as, by way of non-limiting example, hydroxyl, carboxyl, phosphate, sulfate, and other charged groups, which can interfere with pollutant binding sited in the algal biomass.

In another embodiment, the filter is configured to remove organic matter from the aquaculture wastewater, wherein said organic matter is trapped by filter pores of the filter. In this regard, the present filter can operate in a manner similar to a sand filter, trapping organic matter to remove it from the aquaculture wastewater being treated.

The filter as described herein can be configured for use in a recirculating aquaculture system (RAS). As such, the filter can be capable of being reused several times after activation.

In an embodiment, the *Chlorella ellipsoidea* lipid free biomass by-product used in forming the present filter can have antimicrobial activity. This antimicrobial activity can help to reduce the microbial load in aquaculture wastewater being treated, and thus the microbial load in the discharged water.

In one aspect of the present subject matter, each layer of the multiple layers of the filter can be separately changeable. In this regard, the filter can have from 4 to 6 layers. In certain embodiments, each layer of the 4 to 6 layers can have a thickness of about 10 cm. A total thickness of the filter can be about 40 to about 60 cm.

In another embodiment, the multiple layers of the filter are arranged linearly in a linear arrangement such that a first layer of the multiple layers contacting aquaculture wastewater to be treated has a high porosity and each succeeding layer of the multiple layers following the first layer has a lower porosity than its immediately preceding layer.

In this regard, pores of the first layer of the multiple layers are wide, as they can be about 500 to about 600 µm, with pore size of each succeeding layer following the first layer in the linear arrangement reducing gradually such that pores of a last layer of the multiple layers are about 75 µm. This gradual reduction of pore size in successive layers can promote efficient contact of the aquaculture wastewater to be treated to the algal biomass forming the various filter layers and prevent the passage of fine organic matter through the entire filter. This can further permit the filter to be used for multiple aquaculture wastewater treatments before the pores become clogged with organic matter particles, thereby requiring cleaning. Once the pores of a layer become clogged, that layer can be removed from the filter and either cleaned prior to being returned to the filter or replaced with a new, or previously cleaned, layer.

Figure 2:
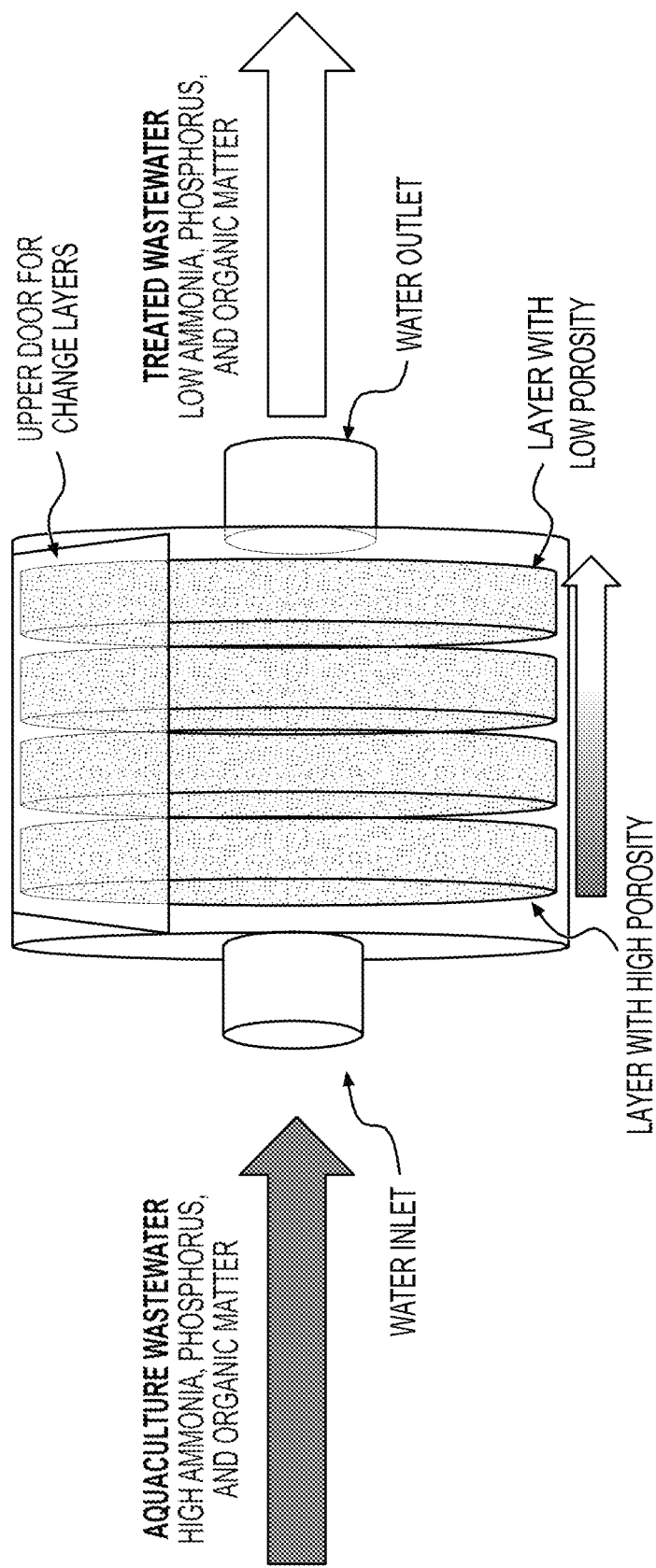
FIG. 2 is a schematic diagram of the multi-layer filter of *Chlorella ellipsoidea*.

In another embodiment, the filter can be placed within a frame or holder to contain the multiple layers of the filter, as seen in FIG. 2. This frame can contain a chamber housing the multiple layers, a water inlet for receiving the aquaculture wastewater to be treated, and a water outlet for conveying the treated wastewater, such as treated wastewater having low levels of ammonia, phosphorus, and organic matter.

In certain embodiments, each layer of the filter can have a water-resistant substance to solidify each layer and prevent breakdown of each layer. Water-resistant substances useful herein can include, by way of non-limiting example, substances selected from the group consisting of a polyurethane, a silicone, and combinations thereof.

In certain embodiments, since each layer of the multiple layers of the filter have a different porosity, a different compression pressure is used to form each layer. Each layer can be separately formed using a simple compressor with pressure control, permitting the formation of different layers having different porosities.

In another embodiment, the present subject matter relates to a method for treating aquaculture wastewater, as described in FIG. 1. In an embodiment, the method comprises: providing a filter comprising a linear arrangement of multiple layers of a compressed *Chlorella ellipsoidea* lipid free biomass by-product of *Chlorella ellipsoidea* biodiesel production and a water-resistant substance to solidify the compressed *Chlorella ellipsoidea* lipid free biomass by-product into the multiple layers, wherein each of the multiple layers is separately changeable; passing aquaculture wastewater to be treated through the filter such that the aquaculture wastewater initially contacts a first layer of the multiple layers having a high porosity, with each succeeding layer following the first layer in the linear arrangement having a lower porosity than its immediately preceding layer; removing ammonia, phosphorus, and organic matter from the aquaculture wastewater as the aquaculture wastewater passes through the filter; and recovering treated wastewater having low levels of ammonia, phosphorus, and organic matter.

In certain embodiments of the present methods, the filter can be placed within a frame or holder to contain the multiple layers of the filter. As shown in FIG. 2, the frame can include a water inlet through which the aquaculture wastewater to be treated passes, a water outlet through which the treated wastewater is recovered, and an upper door for changing one or more layers of the multiple layers of the filter.

In other embodiments, the present methods can further comprise cleaning one or more layers of the multiple layers of the filter, wherein the first layer of the multiple layers requires most frequent cleaning to prevent cessation of water flow by filtered organic matter, with each succeeding layer following the first layer in the linear arrangement requiring a lower frequency of cleaning than its immediately preceding layer. In one embodiment, the cleaning can be done by backwashing.

Another embodiment of the present methods further comprises periodically activating and cleaning the filter by backwashing and drying to remove ammonia and/or phosphorous collected on, attached to, or adsorbed on the filter. In certain non-limiting embodiments, the drying can be conducted by the sun or in an oven. Once removed, the ammonia and/or phosphorous can be collected and used in the production of other products, including, by way of non-limiting example, fertilizer or animal feed.

Once cleaned, the cleaned layer, or the cleaned filter, can be easily reinserted into the frame for use in further aquaculture wastewater treatments.

Several factors can impact the timing and frequency of replacing and cleaning an individual layer, or the filter as a whole. Such factors can include ammonia and waste levels in the water being treated, the size of the filter, and the flow rate of water through the filter. Accordingly, the changing, replacing, or activation of the filter layers can be optimized based on the water volume and waste levels of the aquaculture wastewater to be treated.

In an embodiment, the present methods and filters can achieve an efficiency of about 60% or greater of removing the ammonia, phosphorus, and organic matter from the aquaculture wastewater.

In another embodiment, pores of the first layer of the multiple layers can be about 500 to about 600 μm, with a pore size of each succeeding layer following the first layer in the linear arrangement reducing gradually such that pores of a last layer of the multiple layers can be about 75 μm.

It is to be understood that the filters and methods described herein are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A filter for treating aquaculture wastewater, the filter comprising:
multiple layers of a compressed *Chlorella ellipsoidea* lipid free biomass by-product of *Chlorella ellipsoidea* biodiesel production and a water-resistant substance to solidify the compressed *Chlorella ellipsoidea* lipid free biomass by-product into the multiple layers, wherein each of the multiple layers is separately changeable.

2. The filter as recited in claim 1, wherein the filter has a gradient of porosity to allow efficient adsorption of one or more of ammonia, phosphorous, or wastes from the aquaculture wastewater.

3. The filter as recited in claim 1, wherein the filter is configured to remove organic matter from the aquaculture wastewater, wherein said organic matter is trapped by filter pores of the filter.

4. The filter as recited in claim 1, configured for use in a recirculating aquaculture system (RAS).

5. The filter as recited in claim 1, capable of being reused after activation.

6. The filter as recited in claim 1, wherein the *Chlorella ellipsoidea* lipid free biomass by-product has antimicrobial activity.

7. The filter as recited in claim 1, wherein the filter has from 4 to 6 layers.

8. The filter as recited in claim 7, wherein each layer of the 4 to 6 layers has a thickness of about 10 cm, with a total thickness of the filter being about 40 to about 60 cm.

9. The filter as recited in claim 8, wherein the multiple layers of the filter are arranged linearly in a linear arrangement such that a first layer of the multiple layers contacting aquaculture wastewater to be treated has a high porosity and each succeeding layer of the multiple layers following the first layer has a lower porosity than its immediately preceding layer.

10. The filter as recited in claim 9, wherein pores of the first layer of the multiple layers are about 500 to about 600 μm, with pore size of each succeeding layer following the first layer in the linear arrangement being reduced in pore size such that pores of a last layer of the multiple layers are about 75 μm.

11. The filter as recited in claim 1, wherein the filter is placed within a frame or holder to contain the multiple layers of the filter.

12. The filter as recited in claim 1, wherein the water-resistant substance is selected from the group consisting of polyurethane, silicone, and combinations thereof.

13. A method for treating aquaculture wastewater, the method comprising:
providing a filter comprising a linear arrangement of multiple layers of a compressed *Chlorella ellipsoidea* lipid free biomass by-product of *Chlorella ellipsoidea* biodiesel production and a water-resistant substance to solidify the compressed *Chlorella ellipsoidea* lipid free biomass by-product into the multiple layers, wherein each of the multiple layers is separately changeable;
passing aquaculture wastewater to be treated through the filter such that the aquaculture wastewater initially contacts a first layer of the multiple layers having a high porosity, with each succeeding layer following the first layer in the linear arrangement having a lower porosity than its immediately preceding layer;
removing ammonia, phosphorus, and organic matter from the aquaculture wastewater as the aquaculture wastewater passes through the filter; and
recovering treated wastewater.

14. The method as recited in claim 13, wherein the filter is placed within a frame or holder to contain the multiple layers of the filter, the frame including a water inlet through which the aquaculture wastewater to be treated passes, a water outlet through which the treated wastewater is recovered, and an upper door for changing one or more layers of the multiple layers of the filter.

15. The method as recited in claim 13, further comprising cleaning one or more layers of the multiple layers of the filter, wherein the first layer of the multiple layers requires most frequent cleaning to prevent cessation of water flow by filtered organic matter, with each succeeding layer following the first layer in the linear arrangement requiring a lower frequency of cleaning than its immediately preceding layer.

16. The method as recited in claim 15, wherein the cleaning is done by backwashing.

17. The method as recited in claim 13, further comprising periodically activating and cleaning the filter by backwashing and drying to remove ammonia collected on or attached to the filter.

18. The method as recited in claim 13, wherein the filter has an efficiency of about 60% or greater of removing the ammonia, phosphorus, and organic matter from the aquaculture wastewater.

19. The method as recited in claim 13, wherein pores of the first layer of the multiple layers are about 500 to about 600 μm, with pore size of each succeeding layer following the first layer in the linear arrangement being reduced in pore size such that pores of a last layer of the multiple layers are about 75 μm.

* * * * *